(12) United States Patent
Harrison et al.

(10) Patent No.: US 6,912,694 B1
(45) Date of Patent: Jun. 28, 2005

(54) PROVIDING A SCROLLING FUNCTION FOR A MULTIPLE FRAME WEB PAGE

(75) Inventors: Edward R. Harrison, Beaverton, OR (US); Alyson R. Miller, Portland, OR (US); James W. Lundell, Portland, OR (US); Cindy L. Merrill, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 09/605,929

(22) Filed: Jun. 28, 2000

(51) Int. Cl.[7] .............................................. G09G 5/00
(52) U.S. Cl. ...................................................... 715/784
(58) Field of Search ................................ 345/830, 784, 345/785, 786, 787, 164; 715/830, 784, 785, 786, 787

(56) References Cited

U.S. PATENT DOCUMENTS 5,530,455 A * 6/1996 Gillick et al. ............... 345/163
5,726,669 A   3/1998 Obata et al. ................. 345/733
5,877,760 A * 3/1999 Onda et al. .................. 345/784
6,020,887 A * 2/2000 Loring et al. ................ 345/786
6,430,574 B1 * 8/2002 Stead ........................ 707/104.1

FOREIGN PATENT DOCUMENTS

JP          07 261992 A      10/1995

OTHER PUBLICATIONS

Moving Split Bar in a Customized Details View, IBM Technical Disclosure Bulletin, vol. 34, No. 7A, Dec. 1991, pp. 426–428, Armonk, NY.
Patent Abstracts of Japan, vol. 1996, No. 02, Feb. 29, 1996 & JP 07 261992 A (Matsushita Electric Ind. Co. Ltd.), Oct. 13, 1995 Abstract.
Patent Abstracts of Japan, vol. 017, No. 045, Jan. 28, 1993 & JP 04 259034 A (Fujitsu Ltd.), Sep. 14, 1992 Abstract.

* cited by examiner

Primary Examiner—Kristine Kincaid
Assistant Examiner—Thanh Vu
(74) Attorney, Agent, or Firm—Trop, Pruner & Hu, P.C.

(57) ABSTRACT

A scroll device may be provided on a processor-based system to simultaneously scroll both of at least two frames in two separate windows. Thus, each frame is scrolled until a first frame reaches its beginning or end. At that point, the scrolling of the first frame stops automatically while the other frame continues to scroll.

15 Claims, 5 Drawing Sheets

PROVIDING A SCROLLING FUNCTION FOR A MULTIPLE FRAME WEB PAGE

BACKGROUND

This invention relates to processor-based systems and to scrolling displays of processor-based systems.

Internet web browsers are software typically running on a processor-based system that allow web pages to be displayed on a monitor or other display device. Web pages may contain one page of information that is optionally scrollable or they may contain multiple "frames" each of which may be independent scrollable. Scrolling is typically done using graphical user interfaces called scroll bars, for example in Microsoft® Windows®. Generally, one scroll bar is used for each frame.

In some processor-based systems, such as Internet appliances, it may be more desirable to provide a mechanical scrolling device to facilitate scrolling through the various frames making up a web page. This may provide simpler operation compared to using a graphical user interface scroll bar.

The mechanical scrolling device may be a scroll wheel, push-button switch or a rocker switch as examples. In each case, when the displayed object, such as a web page, has a length greater than a normal video display window, the object may be viewed by scrolling the display using the mechanical scrolling device.

A problem arises with a mechanical scrolling device when more than one frame is available to be scrolled at a given time on the same page. If the user operates the scrolling device, an ambiguity arises with respect to which frame should be scrolled.

Thus, there is a need for a better way to implement scrolling using a scrolling device.

DETAILED DESCRIPTION

Figure 1:
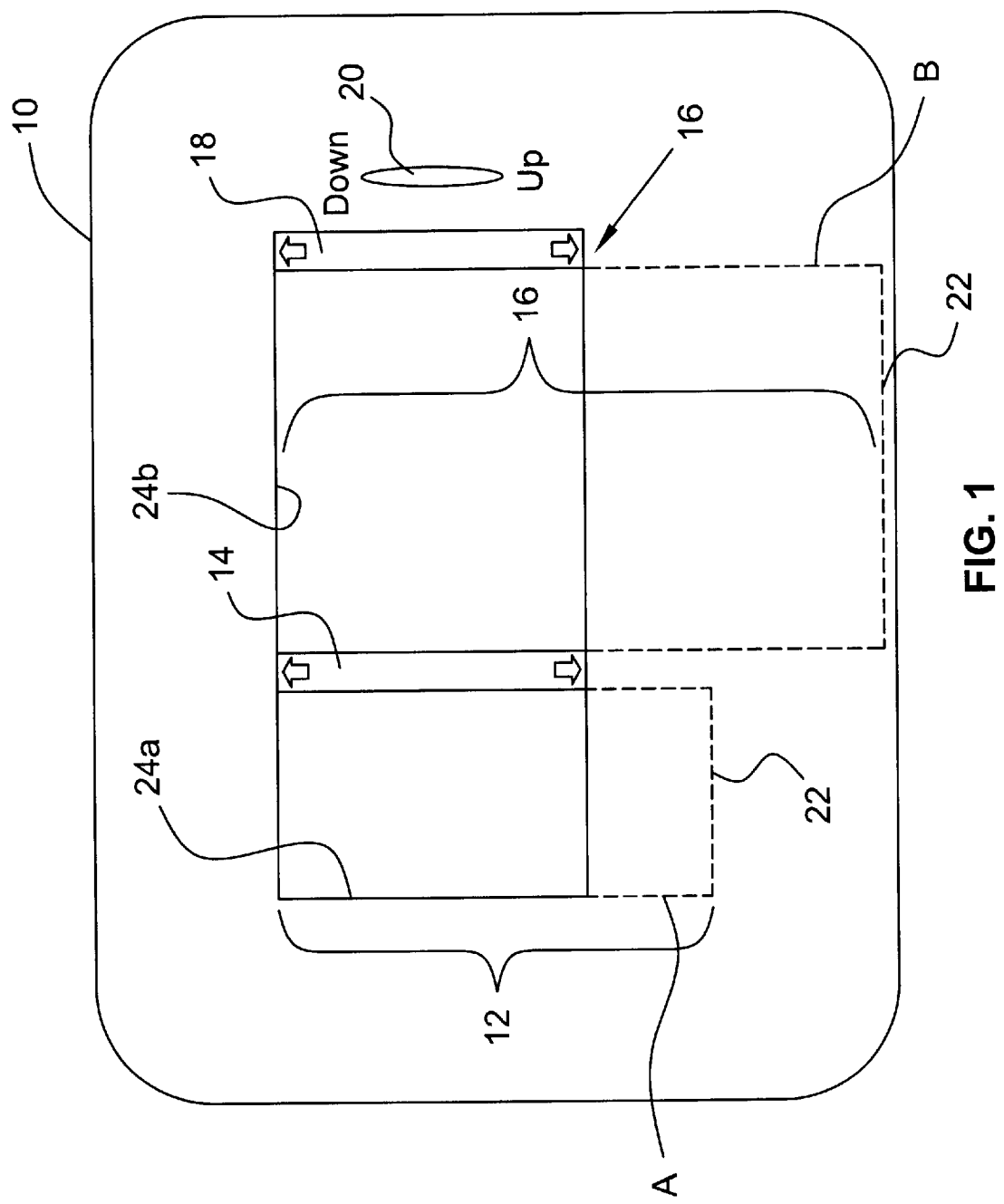
FIG. 1 is a screen display, in accordance with one embodiment of the present invention.

Referring to FIG. 1, a scrolling function may be implemented through a graphical user interface 10 displayed on a display associated with a processor-based system. The processor-based system may be a conventional computer system, such as a desktop computer system or a laptop computer system. It may also be an appliance-like device, such as an Internet or web appliance. It may also be a handheld device, such as a handheld computer system or a cellular phone. The system may also be an embedded system such as an Internet tablet that may be dedicated to a limited application without an open operating system.

The interface 10 may include a pair of frames 12 and 16. Each frame 12 or 16 may include a graphical scroll bar 14 or 18 in one embodiment of the invention. Each scroll bar 14 or 18 enables each frame 12 or 16 to be scrolled relative to the other.

Each viewable window 24 displays only a portion of a frame 12 or 16. Thus, referring to FIG. 1, each frame includes a portion A or B which extends below the window 24a or 24b. Thus, in the illustrated embodiment, each frame 12 or 16 is larger than its corresponding window 24a or 24b respectively.

A scroll device 20 is provided for scrolling both frames 12 and 16 simultaneously. The scroll device 20 may be a rotary switch as one example. Rotating the scroll device 20 in the downward direction for example, causes the unexposed portion A of the frame 12 and the unexposed portion B of the frame 16 to come into view in each viewable window 24.

Figure 2:
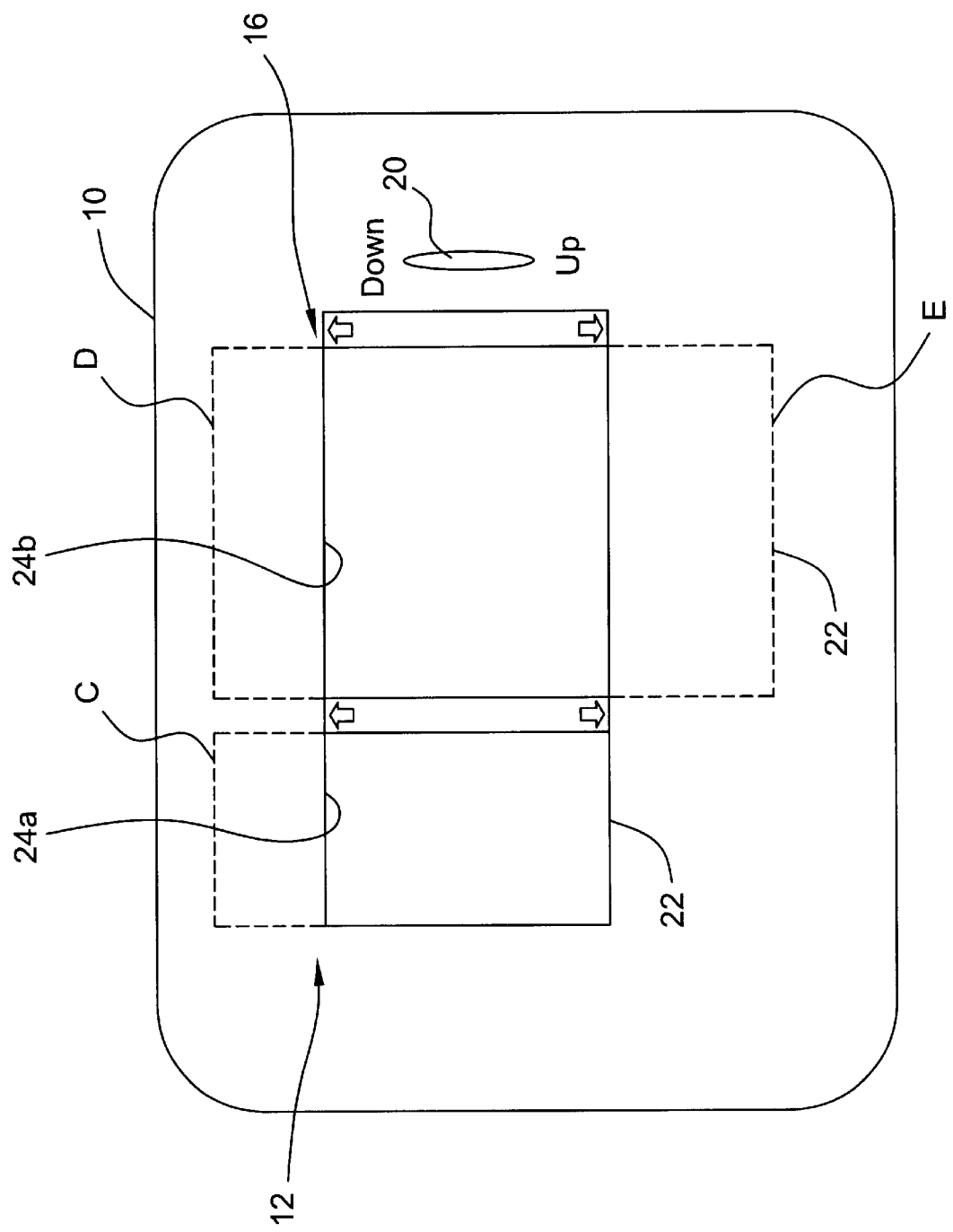
FIG. 2 is another screen display, in accordance with one embodiment of the present invention.

In other words, the portion A that is not displayed within the window 24a associated with the frame 12 is caused to extend into the window 24a while the portion C, shown in FIG. 2, is caused to extend above the window 24a. Likewise, with the frame 16, the unexposed portion B below the window 24b may be scrolled upwardly into view within the window 24b while the portion D extends above the window 24b as shown in FIG. 2. The portion D has extended upwardly beyond the upper edge of the window 24b, but because the frame 16 is bigger than the frame 12, a remaining portion E, is still not exposed within the window 24b.

Figure 3:
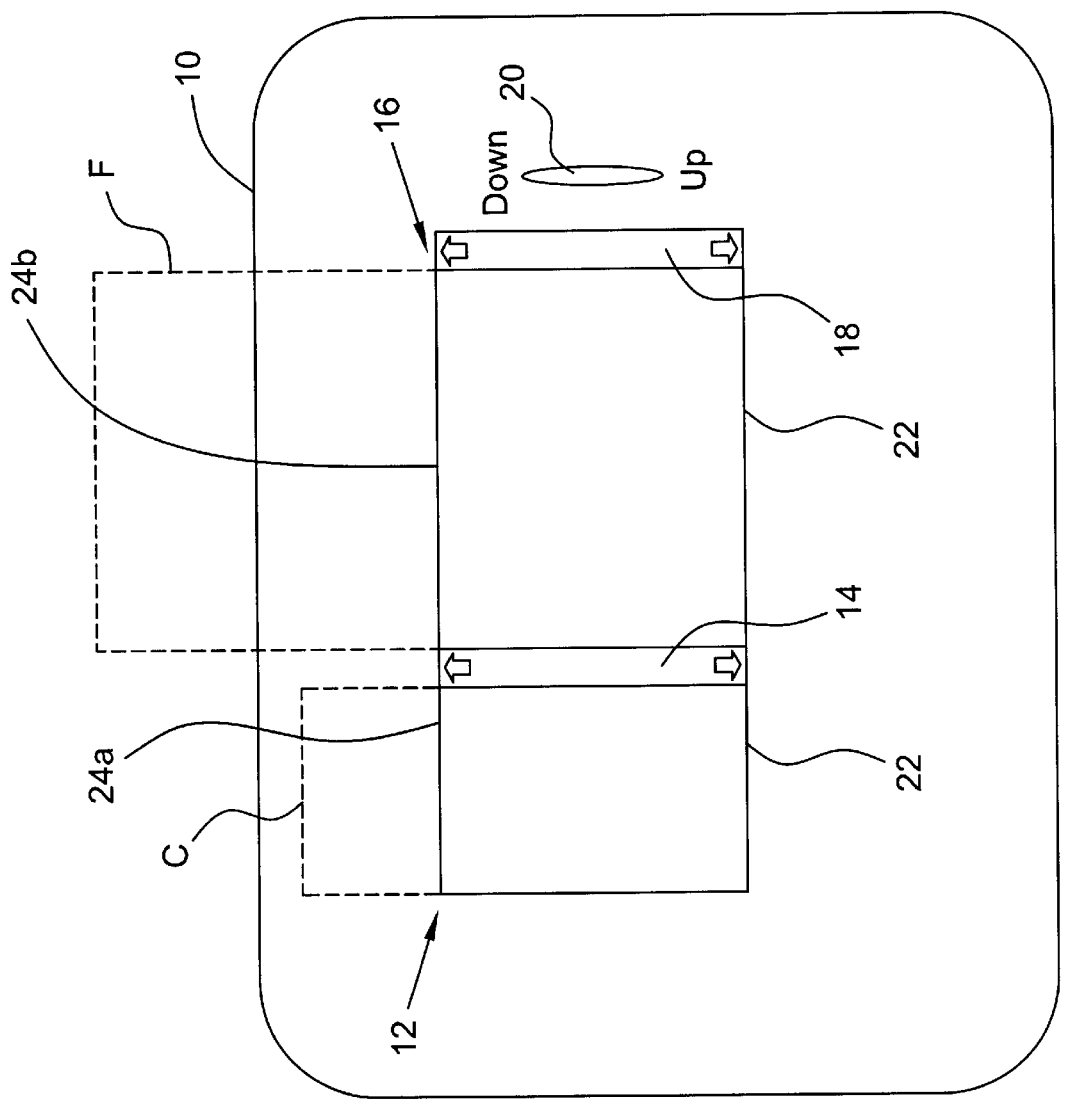
FIG. 3 is a screen display, in accordance with one embodiment of the present invention.

In accordance with one embodiment of the present invention, when the scroll device 20 is operated in the upward direction, frame 12 no longer scrolls, since it has reached its bottom end 22. However, the frame 16 in the window 24b continues to scroll, as shown in FIG. 3, until the bottom end 22 of the frame 16, reaches the bottom of the window 24b. At this point, a frame portion F has scrolled upwardly past the window 24b. Rotating the scroll device 20 in the upward direction no longer moves either frame 12 or frame 16. The same operation is achieved when the scroll device 20 is operated for downward scrolling.

Figure 4:
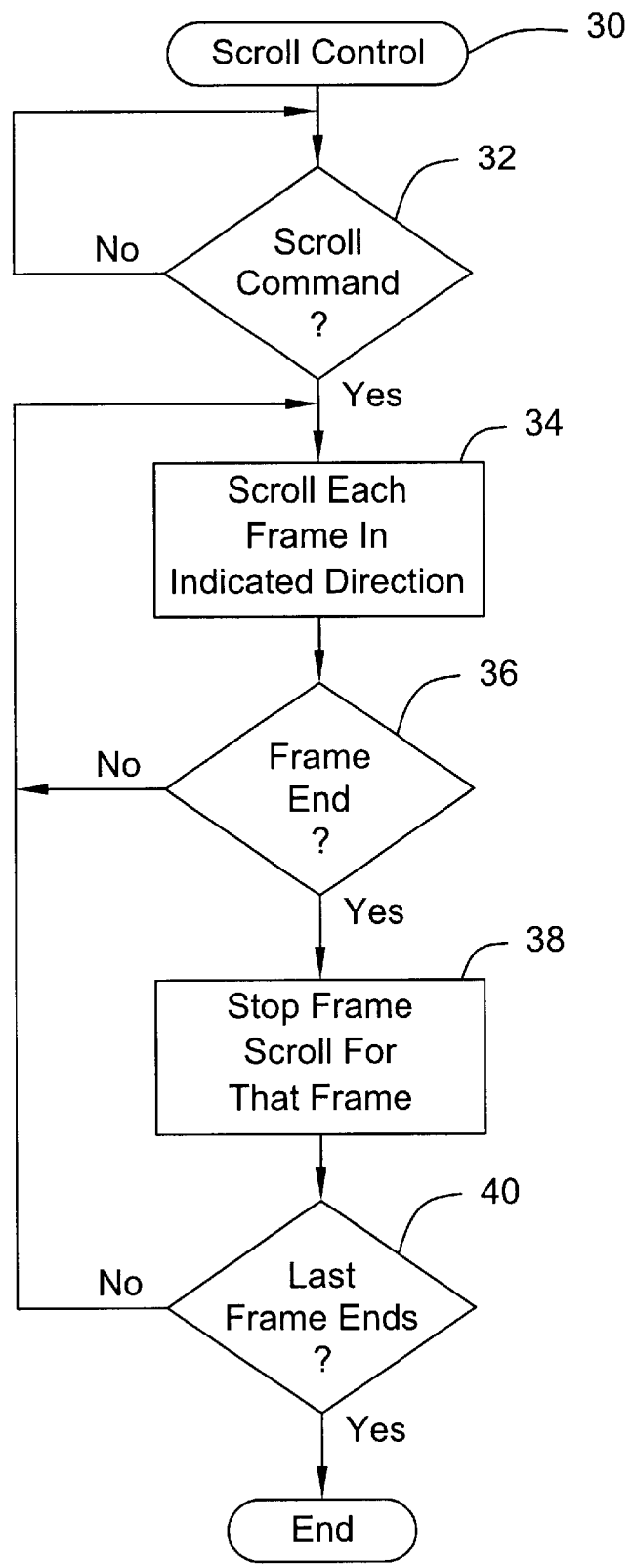
FIG. 4 is a flow chart for software, in accordance with one embodiment of the present invention.

Referring next to FIG. 4, the software 34, implementing one embodiment of the scroll control feature, begins by determining whether a scroll command has been received from the scroll device 20, as determined at diamond 32. If so, each frame 12 or 16 is scrolled in the direction of operation of the scroll device 20, as indicated in block 34. A check at diamond 36 determines whether a frame end 22 has been reached. If so, that frame's scrolling is terminated as indicated in block 38. The other frame continues to be scrolled. A check at diamond 40 determines whether the other frame has reached its end 22. If so, the flow ends. If not, the flow iterates back to block 34.

Figure 5:
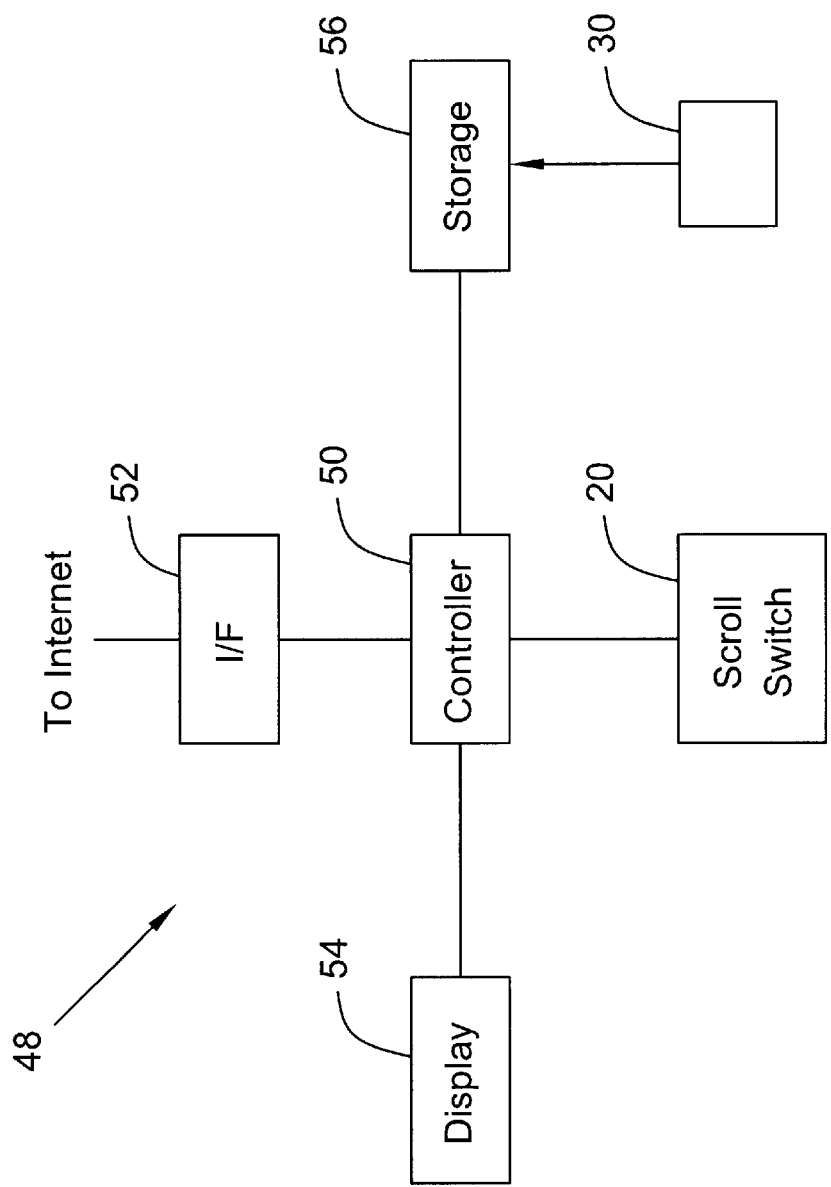
FIG. 5 is a block diagram for hardware, in accordance with one embodiment of the present invention.

Turning next to FIG. 5, a processor-based system 48 may be in the form of an Internet appliance, in accordance with one embodiment of the present invention. It may include a controller 50 that may be a processor in one embodiment. The controller 50 is coupled to the scroll device 20. It is also coupled to a display 54 that displays the graphical user interface 10. The display 54 may be coupled to the system 48 by a wired or wireless link.

Likewise, the controller 50 may be coupled to a wireless interface 52 that provides a wireless Internet connection. The interface 52 may, for example, be a modem. The controller 50 also couples a storage 56 that may be a non-volatile memory, such as a hard disk drive or a flash memory. The storage 56 may store a browser as well as the software 30, shown in FIG. 4.

In accordance with one embodiment of the present invention, when the scroll device 20 is operated, both frames 12 and 16 scroll automatically in the indicated direction. This avoids the need to provide each frame 12 or 16 with its own independent scroll device 20. On some systems, there is a relatively limited screen space for this additional device 20. Moreover, added complexity may arise from using independent scroll devices 20. Alternatively, if only one scroll device 20 is used for two frames, a focus assigning system may be needed that may add operational complexity. With the embodiments of the present invention, the user does not need to indicate which frame to scroll, because both frames 12 and 16 are automatically scrolled, if possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving a command to scroll each of a first frame for display in a first display window and a second frame for display in a second display window, said first and second frames having a beginning and an end, at least one of said frames being larger than its window;

scrolling each frame in its window in response to said command;

determining when the beginning or end of one of said frames is displayed in its window; and automatically stopping the scrolling of a frame when its beginning or end is displayed while continuing to scroll the other of said frames.

2. The method of claim 1 including enabling each frame to be scrolled relative to the other frame using a scroll bar associated with each frame.

3. The method of claim 1 wherein scrolling each frame includes operating a scroll device to scroll each frame.

4. The method of claim 3 wherein operating a scroll device includes rotating a scroll switch.

5. The method of claim 1 including organizing each frame with respect to a window at a different distance from its frame end and simultaneously scrolling both frames.

6. The method of claim 1 including providing only a single scroll device for more than one frame.

7. An article comprising a medium storing instructions that enable a processor-based system to:

receive a command to simultaneously scroll each of two frames in each of two windows;

determine when the beginning or end of one of said frames is displayed in its window; and automatically stop the scrolling of a frame when its beginning or end is displayed while continuing to scroll the other of said frames.

8. The article of claim 7 further storing instructions that enable the processor-based system to enable each frame to be scrolled relative to the other frame using a scroll bar associated with each frame.

9. The article of claim 7 further storing instructions that enable the processor-based system to receive a command from a scroll device to scroll each frame.

10. The article of claim 9 further storing instructions that enable the processor-based system to receive a command from a scroll switch.

11. The article of claim 7 further storing instructions that enable the processor-based system to organize each frame with respect to a window at a different distance from its frame end and simultaneously scroll both frames.

12. The article of claim 7 further storing instructions that enable the processor-based system to receive a command from a single scroll device to scroll more than one frame in more than one window.

13. A system comprising:

a processor-based device; and a storage coupled to said processor-based device storing instructions that enable the processor-based device to receive a command to simultaneously scroll each of two frames in each of two windows on said display, determine when the beginning or end of one of said frames is displayed in its window and automatically stop the scrolling of a frame when its beginning or end is displayed while continuing to scroll the other of said frames.

14. The system of claim 13 wherein said scroll device is a rotary scroll switch.

15. The system of claim 13 wherein said storage stores instructions that enable the processor-based device to receive a command from a single scroll device to scroll more than one frame in more than one window.

* * * * *